UNITED STATES PATENT OFFICE.

WILLIAM JAY McDONALD, OF GAINESVILLE, GEORGIA.

PAINT COMPOUND.

SPECIFICATION forming part of Letters Patent No. 258,663, dated May 30, 1882.

Application filed February 23, 1882. (No specimens.)

*To all whom it may concern:*

Be it known that I, WILLIAM JAY McDONALD, a citizen of United States, residing at Gainesville, in the county of Hall and State of Georgia, have invented certain new and useful Improvements in Paint Compounds; and I do hereby declare the following to be a full, clear, and exact description of the invention.

My invention relates to paint compounds or compositions for coating wood and metal surfaces; and it consists in a composition which I call the "water-proof cement-paint," and it is formed as hereinafter specified.

To enable others not skilled to prepare this composition of matter, I will describe the method of compounding and the ingredients and the proportions used.

I take five hundred (500) pounds of gas-tar and mix therewith thirty-eight (38) pounds of asphaltum varnish, to which is to be added three (3) gallons of spirits of turpentine, and the whole mass should then be well stirred together. To this I add ten (10) pounds of Venetian red, and ten (10) pounds of yellow ocher mixed in four (4) gallons of spirits of turpentine, and two (2) pounds of gum-shellac dissolved in one (1) quart of alcohol. Then I take three (3) gallons of water and add to it four (4) pounds of salt and two (2) pounds of sal-soda, and stir until fully dissolved, and add to this one (1) quart of alcohol and one (1) ounce of carbolic acid, and pour the mixture into the first above and stir until thoroughly incorporated. From this it will be seen that the constituents of my water-proof-paint compound are as follows: gas-tar, five hundred pounds; asphaltum varnish, thirty-eight pounds; Venetian red, ten pounds; yellow ocher, ten pounds; gum-shellac, two pounds; salt, four pounds; sal-soda, two pounds; spirits of turpentine, seven gallons; water, three gallons; alcohol, one-half gallon; carbolic acid, one ounce.

I usually heat the paint before applying it to the surface to be covered; but it can be used cold.

This paint is impervious to water, will preserve wood coated with it from decay, and prevents rust in iron.

I disclaim the composition patented to A. F. Hawthorn and G. W. Hawthorn, May 24, 1881, and numbered 241,803.

Having thus described my paint compound, I claim—

A paint composition consisting of gas-tar, asphaltum varnish, Venetian red, yellow ocher, gum-shellac, salt, sal-soda, spirits of turpentine, alcohol, carbolic acid, and water, in the proportions substantially as herein set forth and described.

In testimony whereof I affix my signature in presence of two witnesses.

WILLIAM JAY McDONALD.

Witnesses:
WM. P. WHELCHEL,
J. B. M. MINHUNN.